Patented Aug. 14, 1934

1,969,828

UNITED STATES PATENT OFFICE 1,969,828

SEDATIVE COMPOUNDS

Ernest H. Volwiler, Highland Park, and Donalee L. Tabern, Lake Bluff, Ill., assignors to Abbott Laboratories, North Chicago, Ill., a corporation of Illinois No Drawing. Application November 9, 1931, Serial No. 574,038

9 Claims. (Cl. 260—124)

It has long been known that a number of alkyl substituted amides and ureides of the aliphatic series produce sedation and sleep. Most of these compounds, however, are relatively weak in their sedative and sleep-producing actions, being, in general, considerably less efficient than the corresponding barbituric acid derivatives.

We have now found, however, that the therapeutic activity of this type of compounds may be markedly enhanced by the substitution of higher alkyl groups in the compounds, and that the new substances have a surprisingly low toxicity.

These compounds may be represented by the general formula:

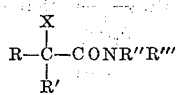

where R represents a saturated alkyl group, R' represents a secondary alkyl group containing more than 3 carbon atoms, X represents hydrogen or a halogen atom, R'' represents hydrogen or an aliphatic hydrocarbon group, and R''' represents hydrogen, an aliphatic hydrocarbon group, the group $CONH_2$, or the group $CONHCOCH_3$.

The amides of this class of compounds having the general formula

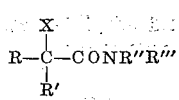

may be prepared by treating the required acid chloride with ammonia or a primary or secondary amine of the aliphatic hydrocarbon series.

The corresponding acetyl urea compounds having the general formula

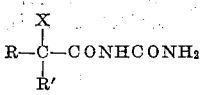

may be prepared by condensing the necessary acid chloride with urea, or by suitable hydrolysis of the corresponding substituted barbituric acid.

The acetyl derivatives of the acetyl urea compounds, having the general formula

may be prepared by heating the necessary acetyl urea compound with acetyl chloride and acetic anhydride, in the presence of zinc chloride.

*Example 1.—Ethyl (1-methyl butyl) acetamide*

Ethyl (1-methyl butyl) acetic acid is prepared by the hydrolysis of ethyl (1-methyl butyl) malonic ester by refluxing with an equal weight of potassium hydroxide in dilute alcohol. Following the hydrolysis, the alcohol is removed by distillation, the reaction mixture is neutralized with hydrochloric acid, the ethyl (1-methyl butyl) malonic acid extracted with benzene, the solvent removed by distillation, and finally the ethyl (1-methyl butyl) malonic acid heated and distilled to eliminate carbon dioxide. The ethyl (1-methyl butyl) acetic acid so obtained boils at 225 to 230° C. It is converted by thionyl chloride at room temperature or slightly above into the corresponding acetyl chloride, which boils at 103 to 108° C. at 45 mm. To prepare ethyl (1-methyl butyl) acetamide, aqueous concentrated ammonia solution is cooled and further saturated with ammonia. While being held at below 10° C., the above acid chloride is slowly dropped in, immediate reaction taking place. After several hours stirring, the mass is filtered, dissolved in alcohol and poured with stirring into cold water. The ethyl (1-methyl butyl) acetamide so obtained melts at 97° to 98° C.

*Example 2.—Ethyl (1-methyl butyl) acetyl urea*

Thirty grams of ethyl (1-methyl butyl) acetyl chloride, together with 25 grams of urea, is placed in a flask equipped with a stirrer and condenser and the mixture is heated to 130° C. Considerable heat is evolved and the lower layer turns solid. It is held at 80° to 100° C. for two hours and cooled to room temperature. The product is washed with dilute sodium hydroxide and recrystallized from dilute alcohol. The product melts at 130° to 133° C. The same product may also be prepared by hydrolysis of the sodium salt of ethyl (1-methyl butyl) barbituric acid by heating in a sealed tube with water at 100° C. for several days.

*Example 3.—Ethyl alpha bromo (1-methyl butyl) acetyl urea*

To ethyl (1-methyl butyl) acetyl chloride at 100° C., there is gradually added one molecular equivalent of bromine. The reaction is very rapid. The product is distilled. It boils at 135° to 150° C. at 55 mm. It is condensed with ammonia to produce the corresponding amide or with urea to produce the ureide as described in Examples 1 and 2.

*Example 4.—Acetyl - ethyl - (1 - methyl butyl) - acetyl urea*

A mixture is prepared of ten grams acetyl chloride, twenty-five grams acetic anhydride, fifteen grams zinc chloride, and ten grams ethyl-(1-methyl butyl) acetamid. The temperature rises to about 50° C. and all the amide dissolves. Water and ice are added, the mixture extracted with ether, the ether solution washed with sodium hydroxide solution, dried with anhydrous sodium sulfate, and the ether removed. The acetyl ethyl (1-methyl butyl) acetyl urea so obtained is an oil.

By the above methods, the following compounds with their melting points have been prepared:

| Compound | Melting point |
|---|---|
| (1-Methyl butyl) acetyl urea | 180° C. |
| Ethyl (1-methyl butyl) acetamid | 97–98. |
| Ethyl (1-methyl butyl) acetyl urea | 133. |
| Alpha-bromo- (1-methyl butyl) acetamid | 112. |
| Alpha-bromo-(1-methyl butyl) methyl acetamid | 90. |
| Alpha-bromo-(1-methyl butyl) acetyl urea | 108. |
| Ethyl-alpha-bromo-(1-methyl butyl) acetyl urea | Oil. |
| Ethyl-alpha-bromo-(1-methyl butyl) acetamid | Oil. |
| Ethyl secondary butyl acetyl urea | 172. |
| n-Butyl (1-methyl butyl) acetyl urea | 123. |
| n-Butyl (1-methyl butyl) acetamid | 97–98. |
| Acetyl ethyl-(1-methyl butyl) acetyl urea | Oil. |

We claim as our invention:

1. A compound of the general structure

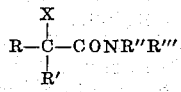

where R represents a saturated alkyl group, R' represents a secondary alkyl group containing 4 or 5 carbon atoms, X represents hydrogen, or a halogen atom, R'' represents hydrogen or an aliphatic hydrocarbon group, and R''' represents hydrogen, an aliphatic hydrocarbon group, the group CONH₂ or the group CONHCOCH₃.

2. A compound of the general structure:

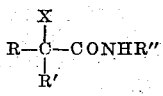

in which R represents a saturated alkyl group, R' represents a secondary alkyl group containing 4 or 5 carbon atoms, X represents hydrogen or a halogen atom, and R'' represents hydrogen or an aliphatic hydrocarbon group.

3. A compound of the general structure:

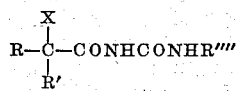

in which R represents a saturated alkyl group, R' represents a secondary alkyl group containing 4 or 5 carbon atoms, X represents hydrogen or a halogen atom, and R'''' represents hydrogen or the group COCH₃.

4. A compound of the general structure:

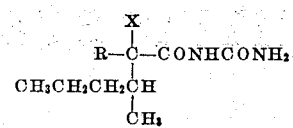

in which R represents a saturated alkyl group, and X represents hydrogen or a halogen atom.

5. A compound of the general structure

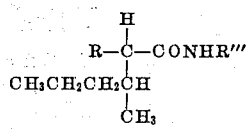

in which R is an alkyl group and R''' represents hydrogen or the group CONH₂ or CONHCOCH₃.

6. A compound of the general structure:

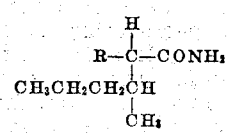

in which R is an alkyl group.

7. A compound having the structure:

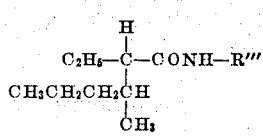

in which R''' represents hydrogen or the group CONH₂ or CONHCOCH₃.

8. The compound ethyl-(1-methyl butyl acetyl urea, having the structure:

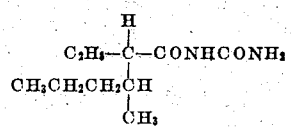

9. The compound ethyl 1-methyl butyl acetamide having the structure:

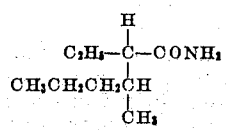

ERNEST H. VOLWILER.
DONALEE L. TABERN.